United States Patent
Lepine et al.

(10) Patent No.: US 12,502,920 B2
(45) Date of Patent: Dec. 23, 2025

(54) BUMP STOP DEVICE WITH SEAL

(71) Applicant: Aktiebolaget SKF, Gothenburg (SE)

(72) Inventors: Thomas Lepine, Tours (FR); Desire Vidot, Ballan-Miré (FR); Bruno Montboeuf, Saint-Cyr-sur-Loire (FR); Francois De Lemps, Saint-Cyr-sur-Loire (FR)

(73) Assignee: Aktiebolaget SKF, Goteborg (CH)

( * ) Notice: Subject to any disclaimer, the term of this patent is extended or adjusted under 35 U.S.C. 154(b) by 565 days.

(21) Appl. No.: 17/865,624

(22) Filed: Jul. 15, 2022

(65) Prior Publication Data
US 2023/0026198 A1    Jan. 26, 2023

(30) Foreign Application Priority Data
Jul. 23, 2021 (FR) ........................... 2108000

(51) Int. Cl.
| | | |
|---|---|---|
| *B60G 11/22* | (2006.01) | |
| *F16C 19/10* | (2006.01) | |
| *F16C 33/78* | (2006.01) | |

(52) U.S. Cl.
CPC .............. *B60G 11/22* (2013.01); *F16C 19/10* (2013.01); *F16C 33/7823* (2013.01); *B60G 2204/418* (2013.01); *B60G 2204/4502* (2013.01)

(58) Field of Classification Search
CPC .. B60G 13/003; B60G 15/063; B60G 15/067; B60G 15/068; B60G 2202/312; B60G 2204/12422; F16F 1/12; F16F 13/007; F16F 9/54; F16C 33/76; F16C 35/042
See application file for complete search history.

(56) References Cited

U.S. PATENT DOCUMENTS

| | | | | |
|---|---|---|---|---|
| 2012/0146306 A1* | 6/2012 | Dubus | ................... | F16C 33/767 384/590 |
| 2013/0277161 A1* | 10/2013 | Bussit | ................. | B60G 13/003 188/321.11 |
| 2014/0023308 A1* | 1/2014 | Stautner | ............... | F16C 33/588 384/590 |
| 2014/0044384 A1* | 2/2014 | Trotter | ................... | F16C 17/18 384/137 |
| 2017/0261032 A1* | 9/2017 | Lepine | .................... | F16C 19/12 |

(Continued)

FOREIGN PATENT DOCUMENTS

| | | |
|---|---|---|
| FR | 2948739 A1 | 2/2011 |
| FR | 3018740 A1 | 9/2015 |
| WO | 2009/106469 A1 | 9/2009 |

*Primary Examiner* — Nicholas J Lane
(74) *Attorney, Agent, or Firm* — THE GARCIA-ZAMOR LAW FIRM; Ruy Garcia-Zamor

(57) ABSTRACT

A device includes a bottom support cover, a top bracing cover, an annular passage being defined between the covers, at least one bearing disposed between the covers, and at least one annular seal. The seal provides a fixing portion secured by mechanical link to a first cover out of the bottom support cover and the top bracing cover and at least one sealing lip extending towards the second cover in such a way that a free end of the lip comes to bear via a sliding-contact portion with a sealing surface of the second cover. The second cover is provided with an annular protection rim protruding from the sealing surface, the protection rim being offset towards the annular passage facing the portion of contact of the free end of the sealing lip with the sealing surface.

7 Claims, 5 Drawing Sheets

(56) References Cited

U.S. PATENT DOCUMENTS

| | | | |
|---|---|---|---|
| 2022/0170510 A1* | 6/2022 | Horikawa | B60G 15/04 |
| 2023/0128517 A1* | 4/2023 | Shibata | F16C 19/10 |
| | | | 280/124.155 |

* cited by examiner

[Fig 1]
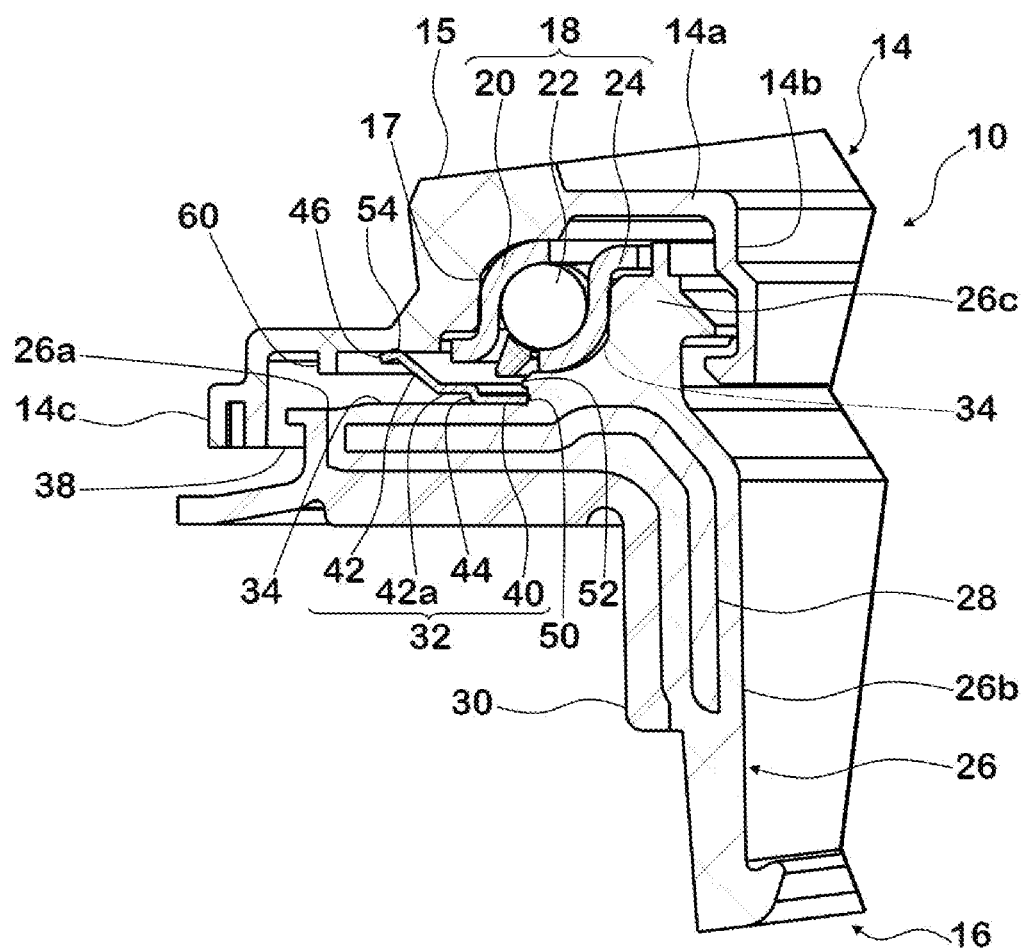

[Fig 2]
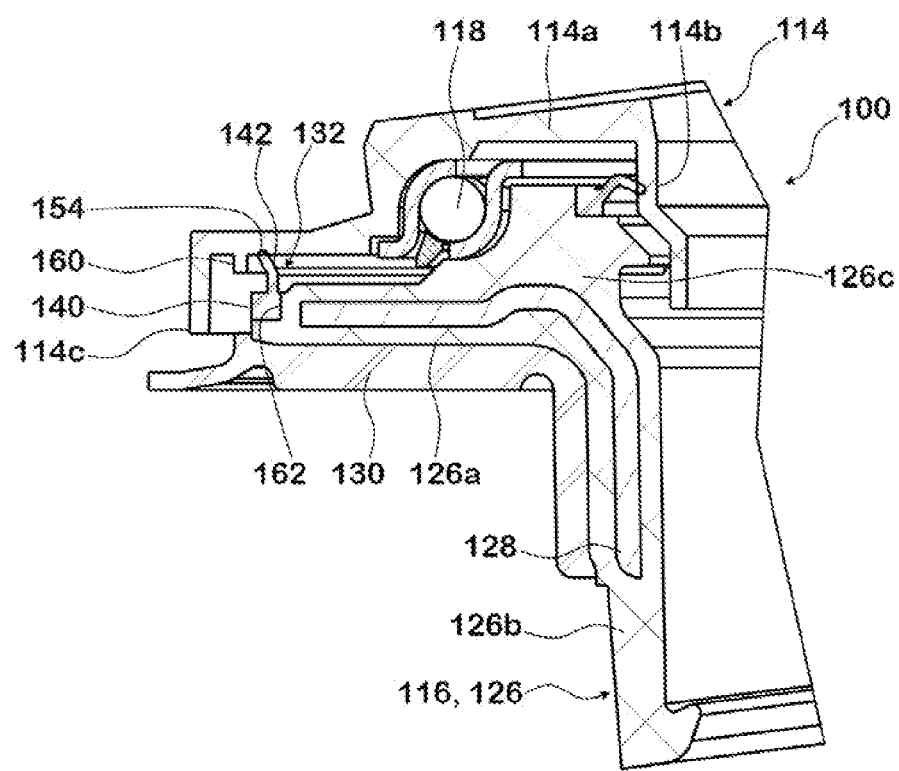

[Fig 3]
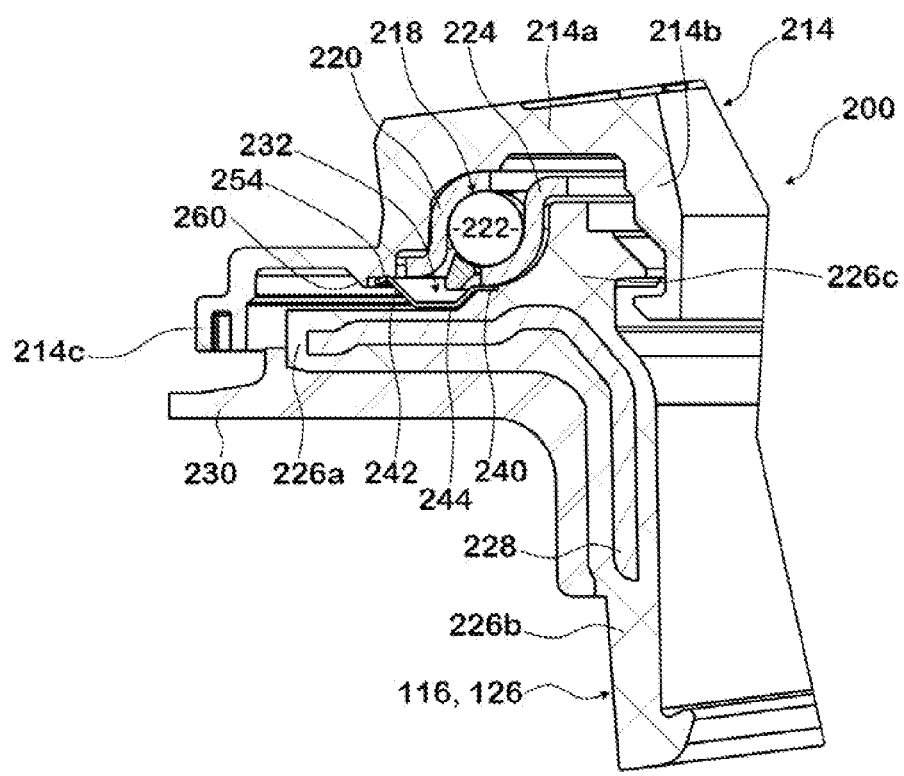

[Fig 4]
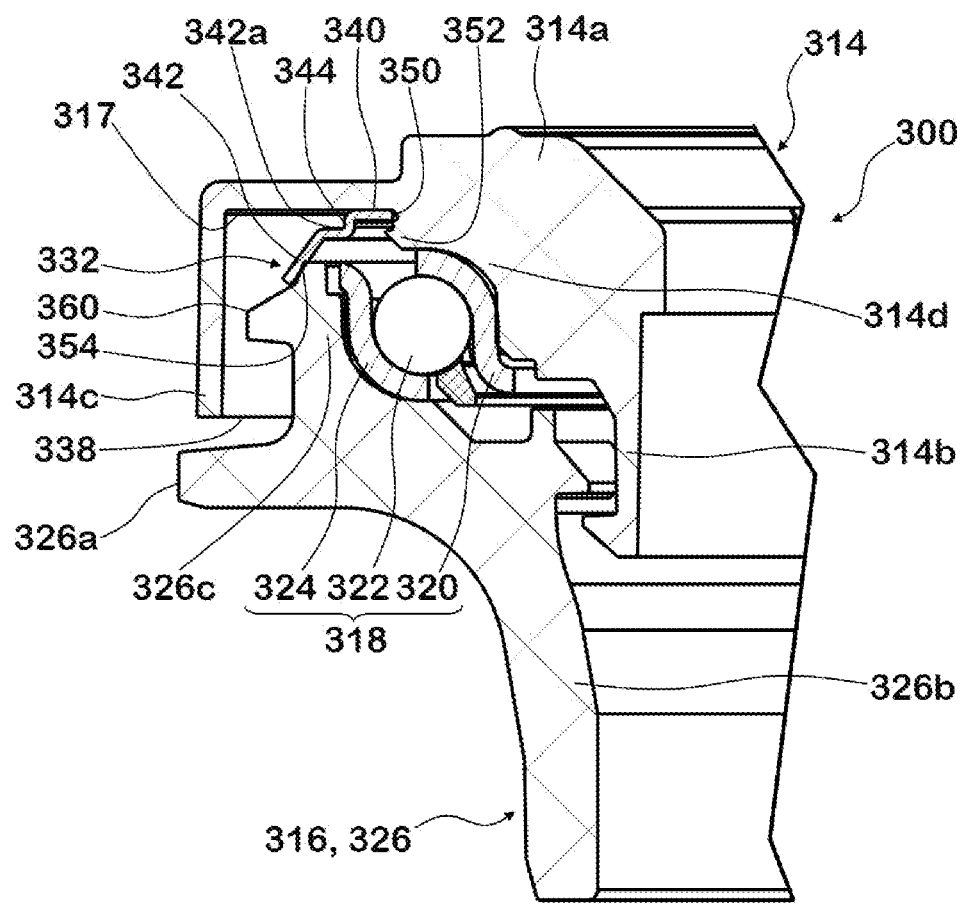

[Fig 5]
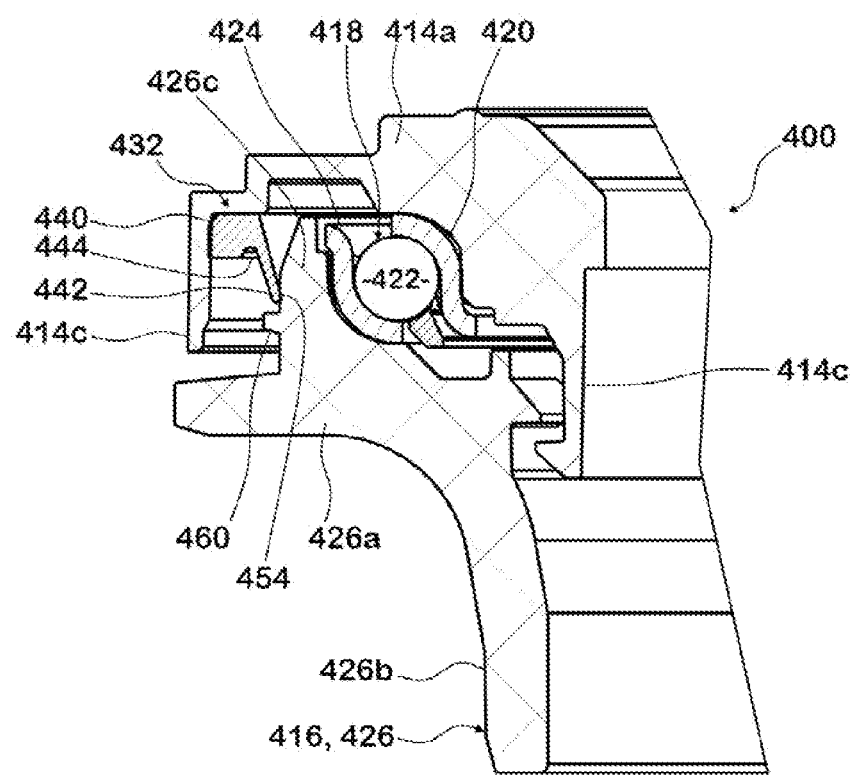

BUMP STOP DEVICE WITH SEAL

CROSS-REFERENCE TO RELATED APPLICATIONS

This application claims priority to French Patent Application no. 2108000, filed Jul. 23, 2021, the contents of which is fully incorporated herein by reference.

TECHNICAL FIELD OF THE INVENTION

The present invention relates to the field of the bump stop devices used in particular for motor vehicles in the suspension struts of the guiding wheels.

STATE OF THE ART

A bump stop device generally comprises an axial stop-forming rolling bearing and top and bottom covers forming a housing for the rings of the rolling bearing and making it possible to provide the interface between the rings and the surrounding elements.

The bump stop device is disposed in the top part of the strut between a suspension spring and the body of the vehicle. The suspension spring is mounted around a damping piston rod, the end of which is linked to the body of the vehicle. The suspension spring, of helical spring type, comes axially to bear directly or indirectly on the bottom cover of the bump stop device.

The bump stop device makes it possible to transmit axial and radial forces between the suspension spring and the body of the vehicle while allowing a relative rotational movement between the bottom cover and the top cover resulting from a steering of the guiding wheels of the vehicle and/or from the compression of the suspension spring.

Generally, the top cover of the bump stop device is provided with a plurality of hooks disposed on an outer or inner skirt and designed to interfere diametrically with a plurality of hooks of the bottom cover. The hooks of each cover are spaced apart from one another in the circumferential direction.

The hooks form retaining means making it possible to axially retain the top and bottom covers with respect to one another. These hooks also form narrow passages in order to limit the ingress of polluting particles radially between the outer or inner skirt of the top cover and the bottom cover.

However, a bump stop device is generally exposed to various types of pollution. With such a device, the polluting particles and water can easily infiltrate between the outer or inner skirt of the top cover and the bottom cover, then be directed towards the rolling bearing and be introduced into the latter. It is common practice to provide at least one seal of rigid or flexible material so as to form a barrier to prevent the ingress of pollution into the space between the covers.

The present invention aims to provide a seal for which efficiency and mounting are enhanced.

SUMMARY OF THE INVENTION

The invention relates to a bump stock device comprising a bottom support cover provided with an annular radial support portion, a top bracing cover provided with an annular radial bracing portion and an annular axial outer skirt, an annular passage being defined between the outer axial skirt and radial support portion, at least one bearing disposed between a top surface of the radial support portion and a bottom surface of radial bracing portion, and at least one annular seal disposed radially at least partly between the outer skirt of the top bracing cover and the bearing. The seal comprises a fixing portion secured by mechanical link to a first cover out of the bottom support cover and the top bracing cover, and at least one sealing lip extending towards the second cover in such a way that a free end of the lip comes into immediate proximity with a sealing surface of the second cover.

According to the invention, the second cover is provided with an annular protection rim protruding from the sealing surface, the protection rim being offset towards the annular passage facing the portion of contact of the free end of the sealing lip with the sealing surface.

The sealing lip makes it possible to limit the ingress of dust, water and other types of polluting particles into the bearing. An outer annular cavity is thus formed inside the device by the top bracing cover, by the bottom support cover, and by the sealing lip, the cavity being open towards the outside by the passage formed between the axial outer skirt and radial support portion. The free end part of the sealing lip forms a dynamic seal by sliding contact with one of the covers. "Dynamic seal" is understood to mean a seal between two parts likely to exhibit relative movement. The sealing lip of the seal makes it possible to stop the flow of water and return it away from the bearing. The sealing lip thus forms a top wall for the outer annular cavity so as to deal with any jet of water entering from the passage formed between the axial outer skirt and the radial support portion.

The protection rim makes it possible to prevent the spraying of pollution directly onto the portion of direct contact between the sealing lip of the seal and the cover. This contact portion is the most sensitive zone for ensuring the sealing of the device, because it is subject to contact being maintained between the wall of the cover and the sealing lip. Now, in the case of jets of water or relative displacement between the covers, the contact pressure of the lip on the cover can be lessened, with a risk of passage of pollutant. The protection rim forms a barrier for the pollution, situated upstream of this contact portion. Thus, even in the case of reduced contact pressure of the lip on the cover, the protection rim limits the pollution on this contact portion. In addition, throughout the life of the device, the protection rim limits the quantity of pollution coming onto this contact portion to limit the degradation of the sealing lip and increase the life of the lip with sealing efficiency.

The annular fixing portion makes it possible to provide a mechanical link of the seal with one of the covers in order to limit any relative displacement by translation or rotation. The holding in position of the seal is ensured when the bump stop device is in operation to provide the function of sealing of the annular space defined between the top bracing and bottom support covers in which the bearing is housed.

According to advantageous but not essential aspects of the invention, such a bump stop device can incorporate one or more of the following features taken in any technically admissible combination:

The free end of the lip comes to bear by a sliding contact portion with the sealing surface of the second cover.

The free end of the sealing lip comprises a protruding rim directed away from the contact surface.

The mechanical link between the seal and the cover consists of a diametral interference between the inner diameter of an inner edge of the fixing portion and the outer diameter of an annular axial outer surface provided on the cover.

The mechanical link between the seal and the cover consists of an overmoulding of the material of the seal on the first cover.

The seal is securely mounted on the top bracing cover, the sealing lip coming into sliding contact with a top sealing surface provided on the bottom support cover.

The seal is securely mounted on the bottom support cover, the sealing lip coming into sliding contact with a bottom sealing surface provided on the top bracing cover.

The sealing surface of the second cover is radial, and the protection rim protrudes axially towards a portion of the first cover.

The sealing surface of the second cover is axial, and the protection rim protrudes radially towards a portion of the first cover.

The bearing is a rolling bearing comprising a first ring supported by a top face of the annular radial support portion, a second ring supported by a bottom face of the top bracing cover, and a plurality of rolling elements housed between the rings.

The top face of the annular radial support portion comprises an annular axial protuberance provided with an annular concave surface matching the form of and forming support for the first ring of the rolling bearing.

The body of the bottom support cover is made of plastic material of polyamide type (for example PA6 to PA6.6), that can possibly be glass-fibre reinforced (for example GF 30 to 60).

The seal is made of rigid material, for example of polyoxymethylene (POM).

The seal is made of polymer material, for example of thermoplastic elastomer (TPE).

BRIEF DESCRIPTION OF THE FIGURES

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention will be better understood on studying the detailed description of embodiments, given as nonlimiting examples and illustrated by the attached drawings in which:

FIG. 1 is a cross-sectional view of a bump stop device according to a first embodiment of the invention, FIG. 2 is a cross-sectional view of a bump stop device according to a second embodiment of the invention, FIG. 3 is a cross-sectional view of a bump stop device according to a third embodiment of the invention, FIG. 4 is a cross-sectional view of a bump stop device according to a fourth embodiment of the invention, and FIG. 5 is a cross-sectional view of a bump stop device according to a fifth embodiment of the invention.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. A bump stop device 10 according to a first embodiment is represented in FIG. 1. The device 10 is designed to be installed between a top bracing cup or seat coming into contact against an element of the fixed chassis of a motor vehicle, and a suspension spring of helical type. In FIG. 1, the device 10 is represented in an assumed vertical position.

The device 10 comprises a top bracing cover 14, a bottom support cover 16, and a rolling bearing 18 interposed axially between the covers. In the example illustrated, the covers 14, 16 are mounted in direct contact with the bearing 18 without any intermediate element in between. Alternatively, the covers 14, 16 can be mounted in indirect contact with the bearing 18 with an intermediate element in between.

As will be described in more detail hereinbelow, the device 10 further comprises an outer seal 32 to prevent the intrusion of pollutants to the bearing 18. The seal 32 closes the axial space defined between the bottom support cover 16 and the top bracing cover 14 including the bearing 18 interposed between these covers, this the space being open by an annular outer passage 38 between the covers 14 and 16.

The top bracing cover 14 comprises a radial portion 14a, an annular axial inner skirt 14b, and an annular axial outer skirt 14c radially surrounding the inner skirt. The radial portion 14a has a top surface 15 intended to face the top bracing seat, and an opposite bottom surface 17 in contact with the bearing 18. The top and bottom surfaces 15, 17 define the thickness of the radial portion 14a. In the example illustrated the radial portion 14a has a staged form.

The outer skirt 14c of the bracing cover partly radially surrounds the bottom support cover 16. The outer skirt 14c extends axially. The outer skirt 14c extends axially from the radial portion 14a. In the example illustrated, the outer skirt 14c extends a large diameter edge of the radial portion 14a so as to form a joining annular internal angle.

The inner skirt 14b of the bracing cover extends inside the bore of the bottom support cover 16. The inner and outer skirts 14b, 14c extend axially downwards from the radial portion 14a. The inner skirt 14b extends with a small diameter edge of the radial portion 14a.

The top bracing cover 14 can consist of a single part, for example made of plastic material, for example such as a polyamide PA 6.6, which may or may not be reinforced with glass fibres.

The bearing 18 is entirely situated radially between the skirts 14b, 14c of the top bracing cover 14. The bearing 18 comprises a top ring 20 in contact with the top bracing cover 14, a bottom ring 24 in contact with the bottom support cover 16, and a row of rolling elements 22, here balls, disposed between the raceways formed on the rings. In the example illustrated, the bearing 18 is of oblique contact type. The top ring 20 is in contact with the bottom surface 17 of the top bracing cover. The bottom ring 24 is in contact with a top surface of the bottom support cover 16. The top ring 20 is positioned towards the outside of the device 10, and the bottom ring 24 is positioned towards the inside of the device 10.

The bottom support cover 16 comprises a body 26, a stiffening insert 28, and a shock absorber 30.

The body 26 of the bottom support cover 16 comprises an annular radial portion 26a in plate form, and an annular axial skirt 26b which extends a small diameter edge of the radial portion 26a. The skirt 26b extends axially away from the top bracing cover 14 and from the bearing 18. The skirt 26b allows the centring of a suspension spring (not illustrated). The radial portion 26a has a bottom annular radial surface, and a top surface 34 in contact with the bottom ring 24 of the bearing and of complementary form. Advantageously, the top surface 34 comprises an annular axial protuberance 26c provided with an annular concave surface matching the form of and forming support for the bottom ring 24 of the rolling bearing 18.

The body 26 of the bottom support cover consists of a single part made of plastic material, for example such as polyamide PA 6 to 6.6, which may or may not be reinforced with glass fibres GF 30 to 60.

In the example illustrated, the support cover 16 comprises a shock absorber 30 provided on the bottom surface of the body 26. The shock absorber is produced as a single-piece part made of elastic material, and comprises a first portion on the bottom radial surface of the radial portion 26a, and a second portion on the outer cylindrical surface of the axial skirt 26b. The shock absorber 30 has a bottom annular radial surface 36 ensuring the support of a suspension spring. The shock absorber 30 makes it possible to damp the shocks and vibrations transmitted by the suspension spring to the bottom support cover 16. Alternatively, the bottom support cover 16 does not include the shock absorber, the bottom annular radial surface of the radial portion 26a of the body 26 then forming a direct support for the suspension spring.

The bottom support cover 16 further comprises a stiffening insert 28 with an annular radial insert portion extending in the annular radial support portion 26a of the body 26, and an annular axial insert tubular portion extending in the annular axial support skirt 26b, the axial insert tubular portion extending a small diameter edge of the radial insert portion.

The stiffening insert 28 is formed in a metal material, for example steel. The plastic material of the body 26 of the bottom cover 16 is overmoulded around the insert 28.

As indicated previously, an outer seal 32 is provided between the bottom support cover 16 and the top bracing cover 14 in order to ensure the sealing of the bearing housed in the radial annular space defined between the covers. The seal 32 is fixed relative to the support cover 16.

The seal 32 is annular and radially surrounds the bearing 18. The bearing 18 is situated radially on the inner side of the seal 32. The seal 32 is situated upstream of the bearing 18 on the outer side of the device 10. The seal 32 is situated radially partly between the outer skirt 14c of the bracing cover and the bearing 18.

The seal 32 comprises a fixing portion formed by an annular fixing lip 40 secured by a mechanical link to the bottom support cover 16, a sealing lip 42 extending from the fixing lip 40, and a stiffening portion 44 situated radially between the lips 40, 42.

The annular fixing lip 40 extends radially between an inner edge of small diameter and a peripheral edge of large diameter. In the embodiment illustrated in FIG. 1, the fixing lip 40 is secured to the bottom support cover 16.

More specifically, the axial protuberance 26c of the radial support portion 26a comprises, at its periphery, an annular axial surface 50. Advantageously, this axial surface 50 is defined in a radially open peripheral groove, and delimited between a portion of the top surface 34 of the body 26 and an annular rim 52 protruding radially outward from the device 10. The inner edge of the fixing lip 40 is securely mounted by diametral interference with the axial surface 50. The axial surface 50 allows a centring of the seal 32 with respect to the cover 16. In addition, the fixing lip 40 extends radially bearing against the surface portion 34 so as to form a bottom axial retention and the positioning of the seal 32 with respect to the cover 16. The fixing lip 40 is also retained axially by the rim 52.

The seal also comprises a sealing lip 42 extending obliquely towards the top bracing cover 14. More specifically, the lip 42 extends obliquely towards the outside and towards the top of the device 10. The sealing lip 42 has a free end 46 coming into sliding contact against a sealing surface 54 at the bottom face of the radial bracing portion 14a of the top bracing cover 14.

According to a particularly advantageous embodiment illustrated in FIG. 1, the sealing lip 42 comprises a first, radial part 42a extending from the stiffening portion 44, and a second, inclined part 42 extending from a large diameter edge of the first radial part 42a. Such an embodiment makes it possible to bring the inclined part of the lip 42 into proximity radially with the top bracing cover 14, and notably ensure an axial offset with respect to the bearing 18.

According to another embodiment illustrated in FIG. 1, the free end 46 of the sealing lip 42 comprises a protruding rim directed away from the contact surface 54.

According to a variant not illustrated, the free end of the sealing lip can come into immediate proximity with the top bracing cover 14 so as to form a labyrinth seal.

An outer annular cavity is thus formed inside the bump stop device 10 by the outer skirt 14c and the bracing radial portion 14a of the top bracing cover 14, by the radial support portion 26 of the body 26 of the bottom support cover 16, and by the seal 32. The cavity is opened outwards by the passage 38 formed between the axial outer skirt 14c and radial support portion 26a. The sealing lip 42 thus forms a top wall for the outer annular cavity so as to deal with any possible jet of water entering from the passage 38. The free end part of the sealing lip 42 forms a dynamic seal with the bottom support cover 16.

The sealing lip 42 further has an inclination with respect to the axial orientation of the outer skirt 14c of the top bracing cover 14, and with respect to the radial orientation of the support portion 26a on which the fixing lip 40 is mounted. More specifically, this inclination is directed towards the outside of the bump stop device 10, and upwards. In the case of a jet of water entering into the outer annular cavity from the passage 38, this jet is deflected by the specific inclination of the lip 42 so as to form a reflux inside the cavity. The particular orientation of the inclination of the lip 42 induces a reflux deflecting the jet in the direction opposite to its direction of arrival: the jet is thus deflected and returned to the passage by another direction thus allowing the water of the jet to be discharged.

The seal 32 also comprises a stiffening portion 44 situated radially between the annular fixing lip 40 and the annular sealing lip 42, the stiffening portion 44 extending axially from the peripheral edge of the fixing lip 40 and towards the top bracing cover 14. The sealing lip 42 extends from the top edge of the stiffening portion 44.

The sealing lip 42 of the seal forms a dynamic seal with the bracing cover 14 over 360°. The fixing lip 40 of the seal 32 is in static sealing contact with the support cover 16 over 360°.

The seal 32 is formed in a single piece, for example by moulding. The seal 32 can for example be produced in a rigid material, for example polyoxymethylene (POM). Alternatively, the seal 32 can also be produced in a less rigid material, for example thermoplastic elastomer, or elastomer such as nitrile.

According to the invention, the top bracing cover 14 further comprises an annular protection rim 60.

The annular protection rim 60 protrudes axially from the sealing surface 54 and extends towards the radial portion 26a of the bottom support cover 16. The protection rim 60 illustrated in FIG. 1 has a parallelepipedal form. The rim 60 can have another suitable form, for example a triangular or curved form. The protection rim 60 is positioned axially towards the outside of the device 10 facing the portion of contact of the free end of the sealing lip 42 with the sealing surface 54. The protection rim 60 is situated radially between the outer axial skirt 14c and the portion of contact of the free end of the sealing lip 42 with the sealing surface 54. The protection rim 60 radially surrounds the free end of the sealing lip 42 in order to limit the passage of pollutants towards and in immediate proximity to the portion of contact of the lip 42 with the sealing surface 54 on the bottom face of the bracing radial portion 14a.

A second and a third embodiment of the invention are illustrated in FIGS. 2 and 3, respectively. These variants of the invention show bump stop devices 100 and 200, respectively, essentially similar to the device 10 illustrated previously in FIG. 1, each with a different example of seal.

The bump stop device 100 illustrated in FIG. 2 comprises a top bracing cover 114, a bottom support cover 116, a rolling bearing 118 interposed axially between the covers, and a seal 132.

The top bracing cover 114 comprises a radial portion 114a, an annular axial inner skirt 114b, and an annular axial outer skirt 114c radially surrounding the inner skirt.

The bottom support cover 116 comprises a body 126, a stiffening insert 128, and a shock absorber 130. The bottom support cover 116 comprises an annular radial portion 126a in plate form, and an annular axial skirt 126b which extends a small diameter edge of the radial portion 126a.

The seal 132 comprises a fixing portion formed by an annular heel 140 secured to the bottom support cover 116, and a sealing lip 142 extending from the annular heel 140.

The annular heel 140 is parallelepipedal, and is housed in an annular outer groove 162 formed at the outer periphery of the support radial portion 126a of the bottom support cover 116. The groove 162 is open radially towards the outside of the device 100 in the direction of the outer skirt 114c of the top bracing cover 114, and is open axially towards the top of the device 100 in the direction of the bracing radial portion 114a.

Advantageously, the annular heel 140 is mounted securely by mechanical link in the groove 162. The mechanical link can consist of a diametral interference of the inner diameter of the annular heel 140 with the outer diameter of an axial wall of the groove 162. The annular heel 140 bears axially against a radial wall of the groove 162. Alternatively, the seal 132 is overmoulded in the groove 162.

The annular sealing lip 142 of the seal 132 extends from a top face of the heel 140 towards the top bracing cover 114. The free end of the sealing lip 142 comes into sliding contact with a sealing surface 154 on the bottom face of the radial bracing portion 114a of the top bracing cover 114.

According to the invention, the top bracing cover 114 further comprises an annular protection rim 160.

The annular protection rim 160 protrudes axially from the sealing surface 154 and extends towards the radial portion 126a of the bottom support cover 116. The protection rim 160 illustrated in FIG. 2 has a parallelepipedal form. The rim 160 can have another suitable form, for example a triangular or curved form. The protection rim 160 is positioned axially towards the outside of the device 100 facing the portion of contact of the free end of the sealing lip 142 with the sealing surface 154. The protection rim 160 is situated radially between the outer axial skirt 114c and the portion of contact of the free end of the sealing lip 142 with the sealing surface 154. The protection rim 160 radially surrounds the free end of the sealing lip 142 in order to limit the passage of pollutants towards and in immediate proximity to the portion of contact of the lip 142 with the sealing surface 154 on the bottom face of the bracing radial portion 114a.

The bump stop device 200 illustrated in FIG. 3 comprises a top bracing cover 214, a bottom support cover 116, a rolling bearing 218 interposed axially between the covers, and a seal 232.

The top bracing cover 214 comprises a radial portion 214a, an annular axial inner skirt 214b, and an annular axial outer skirt 214c radially surrounding the inner skirt.

The bottom support cover 216 comprises a body 226, a stiffening insert 228, and a shock absorber 230. The bottom support cover 216 comprises an annular radial portion 226a in plate form, and an annular axial skirt 226b which extends a small diameter edge of the radial portion 226a.

The bearing 218 comprises a top ring 220 mounted on a bottom face of the top bracing cover 214, a bottom ring 224 mounted on a top face of the bottom support 216, and a row of rolling elements 222, here balls, disposed between the raceways formed on the rings.

The seal 232 comprises a fixing portion formed by an annular fixing lip 240 secured to the bottom support cover 216, a sealing lip 242 extending from the annular heel 240, and a connecting intermediate portion 244 situated radially between the lips 240, 242.

The fixing lip 240 is annular and extends essentially radially. The fixing lip 240 is jammed axially between the bottom ring 224 of the bearing 218 and a top surface of the support radial portion 226a of the bottom support cover 216.

The annular sealing lip 242 of the seal 232 extends towards the top bracing cover 214. The free end of the sealing lip 242 comes into sliding contact with a sealing surface 254 on the bottom face of the radial bracing portion 214a of the top bracing cover 214. The free end of the sealing lip 242 comprise a protruding rim directed away from the contact surface 254.

The connecting intermediate portion 244 is in the form of a cup, with a first part inclined towards the bottom of the device and extending from a large diameter edge of the fixing lip 240, and a second, radial part extending between a bottom edge of the sealing lip 242 and an outer edge of the first part. The connecting intermediate portion 144 is housed in a hollowed-out zone on the top face of the support radial portion 226a to ensure axial compactness of the stop device 200.

According to the invention, the top bracing cover 214 further comprises an annular protection rim 260.

The annular protection rim 260 protrudes axially from the sealing surface 254 and extends towards the radial portion 126a of the bottom support cover 216. The protection rim 260 is positioned axially towards the outside of the device 200 facing the portion of contact of the free end of the sealing lip 242 with the sealing surface 254. The protection rim 260 is situated radially between the outer axial skirt 214c and the portion of contact of the free end of the sealing lip 242 with the sealing surface 254. The protection rim 260 radially surrounds the free end of the sealing lip 242 in order to limit the passage of pollutants towards and in immediate proximity to the portion of contact of the lip 242 with the sealing surface 254 on the bottom face of the bracing radial portion 214a.

A fourth and a fifth embodiment of the invention are illustrated in FIGS. 4 and 5, respectively. These variants of the invention propose bump stop devices 300 and 400, respectively, with a design of emphasized radial compactness.

The device 300 illustrated in FIG. 4 comprises a top bracing cover 314, a bottom support cover 316, and a rolling bearing 318 interposed axially between the covers.

The top bracing cover 314 comprises a radial portion 314a, an annular axial inner skirt 314b, and an annular axial outer skirt 314c radially surrounding the inner skirt. The bracing radial portion 314a of the device 300 is of smaller radial dimension with respect to the radial portion 14a of the device 10 of the preceding embodiment.

The bearing 318 is entirely situated radially between the skirts 314b, 314c of the top bracing cover 314. The bearing 318 comprises a top ring 320 in contact with the top bracing cover 314, a bottom ring 324 in contact with the bottom support cover 316, and a row of rolling elements 322, here balls, disposed between the raceways formed on the rings. Compared to the device 10 of the preceding embodiment, the top ring 320 is positioned towards the inside of the device 300, and the bottom ring 324 is positioned towards the outside of the device 300.

The bottom support cover 316 comprises only a body 326. The bottom support cover 316 comprises an annular radial portion 326a in plate form, and an annular axial skirt 326b which extends a small diameter edge of the radial portion 326a. The support radial portion 326a of the device 300 is of smaller radial dimension with respect to the radial portion 16a of the device 10 of the preceding embodiment. The top surface of the radial portion 326a comprises an annular axial protuberance 326c provided with an annular concave surface matching the form of and forming support for the bottom ring 324 of the rolling bearing 318.

The bottom support cover 316 further comprise an annular axial protuberance 326c provided with an annular concave surface matching the form of and forming support for the bottom ring 324 of the rolling bearing 318.

An outer seal 332 is provided between the bottom support cover 316 and the top bracing cover 314 in order to ensure the sealing of the bearing 318 housed in the radial annular space defined between the covers. The seal 332 is fixed relative to the bracing cover 314.

The seal 332 is similar to the seal 32 of the device 10 of the preceding embodiment. The seal 332 comprises an annular fixing lip 340 and an annular sealing lip 342 for the design similar to the annular fixing lip 40 and to the sealing lip 42, with an axial stiffening portion 144 between the lips 340, 342.

The annular fixing lip 340 extends radially between a small diameter inner edge and a large diameter peripheral edge. In the embodiment illustrated in FIG. 4, the fixing lip 340 is secured to the top bracing cover 314.

More specifically, the bracing radial portion 314a of the cover 314 is staged, and comprises an annular rim 314d protruding axially towards the bottom of the device 300 towards the bottom support cover 316. The annular rim 314d comprises a concave bottom surface forming support for the top ring 320 of the bearing 318. An annular outer surface 350 is defined at the periphery of the annular rim 314d, the inner edge of the fixing lip 340 of the seal 332 being mounted securely by diametral interference around this surface 350.

Advantageously the outer surface 350 is formed in a peripheral annular groove defined between a bottom surface 317 of the radial bracing portion 314a on the top side, and a radially protruding annular hook 352 directed towards the outside of the device 300. The radial fixing lip 340 bears axially against the bottom surface 317.

The stiffening portion 344 extends axially from the large diameter peripheral edge of the fixing lip 340, and towards the top bracing cover 314.

The sealing lip 342 comprises a first, radial part 342a and a second, inclined part 342. The second part 342 extends obliquely towards the outside and towards the bottom of the device 300. The inclined lip comes to bear against a sealing surface 354 at the outer periphery of the axial protuberance 326c in order to produce a seal by sliding contact.

According to the invention, the bottom support cover 316 further comprises an annular protection rim 360.

The annular protection rim 360 protrudes radially from the sealing surface 354 at the periphery of the part 356c, and extends towards the axial skirt 314c of the top bracing cover 314. The protection rim 360 is positioned radially towards a passage 338 defined between the outer axial skirt 314c and the outer edge of the bracing radial portion 326a facing the portion of contact of the free end of the sealing lip 342 with the sealing surface 354. The protection rim 360 is situated axially between this passage 338 and the portion of contact of the free end of the sealing lip 342 with the sealing surface 354 in order to limit the passage of pollutants towards and in immediate proximity to the contact portion.

A fifth embodiment of the invention is illustrated in FIG. 5.

A device 400 comprises a top bracing cover 414, a bottom support cover 416, and a rolling bearing 418 interposed axially between the covers.

The top bracing cover 414 comprises a radial portion 414a, an annular axial inner skirt 414b, and an annular axial outer skirt 414c radially surrounding the inner skirt.

The bearing 418 is entirely situated radially between the skirts 414b, 414c of the top bracing cover 414. The bearing 418 comprises a top ring 420 in contact with the top bracing cover 414, a bottom ring 424 in contact with the bottom support cover 416, and a row of rolling elements 422, here balls, disposed between the raceways formed on the rings.

The bottom support cover 416 comprises only a body 426. The bottom support cover 416 comprises an annular radial portion 426a in plate form, and an annular axial skirt 426b which extends a small diameter edge of the radial portion 426a.

The bottom support cover 416 further comprises an annular axial protuberance 426c provided with an annular concave surface matching the form of and forming support for the bottom ring 424 of the rolling bearing 418.

An outer seal 432 is provided between the bottom support cover 416 and the top bracing cover 414 in order to ensure the sealing of the bearing 418 housed in the radial annular space defined between the covers. The seal 432 is fixed relative to the bracing cover 414.

The seal 432 comprises an annular heel 440 and a sealing lip 442.

The annular heel 440 is advantageously of parallelepipedal form and housed in the joining corner between the outer skirt 414c and the radial portion 414a of the top bracing cover 414. A bottom surface of the bracing radial portion 414a forms a top rim to ensure a top axial retention of the heel 440 in the top bracing cover 414.

The mechanical link between the annular heel 440 of the seal 432 and the annular axial outer skirt 414c of the top bracing cover 414 consists advantageously of a diametral interference between the outer diameter of the heel 440 and the inner diameter of an inner axial surface of the outer skirt 414c, the inner axial surface being delimited axially towards the top by the radial portion 414a, and is feather-edged downwards. As a variant, the seal 432 can be overmoulded in the top bracing cover 414.

The sealing lip 442 of the seal 432 extends protruding from an inner face of the parallelepipedal annular heel 440. The lip 442 extends towards the radial support portion 426a of the body 426 of the bottom support cover 416, in such a way that a free end of the lip 442 comes into sliding contact against an outer axial surface 454 of the annular protuberance 426c of the radial support portion 416a. The sealing lip 442 extends from the heel 440 obliquely towards the inside and downwards.

The seal 432 further comprises an annular hollow 444 at the join between the heel 440 and the lip 442.

According to the invention, the bottom support cover 416 further comprises an annular protection rim 460.

The annular protection rim 460 protrudes radially from the sealing surface 454 at the periphery of the part 426c, and extends towards the axial skirt 414c of the top bracing cover 414. The protection rim 460 is positioned radially towards a passage 438 defined between the outer axial skirt 414c and the outer edge of the bracing radial portion 426a facing the portion of contact of the free end of the sealing lip 442 with the sealing surface 454. The protection rim 460 is situated axially between this passage 438 and the portion of contact of the free end of the sealing lip 442 with the sealing surface 454 in order to limit the passage of pollutants towards and in immediate proximity to the contact portion.

In the exemplary embodiments illustrated, the device comprises an oblique contact rolling bearing provided with a row of balls. The device can comprise other types of rolling bearings, for example a bearing with four points of contact and/or with at least two rows of balls. The rolling bearing can comprise other types of rolling elements, for example rollers. In another variant, the device can comprise a sliding bearing without rolling elements and provided with one or more rings.

The invention claimed is:

1. A bump stop device comprising:
 a bottom support cover provided with an annular radial support portion;
 a top bracing cover provided with an annular radial bracing portion and an annular axial outer skirt,
 an annular passage being defined between the axial outer skirt and radial support portion;
 at least one bearing disposed between a top surface of the radial support portion and a bottom surface of the radial bracing portion; the at least one bearing being a rolling bearing comprising a first ring, a second ring, and a plurality of rolling elements disposed therebetween;
 at least one annular seal disposed radially at least partly between the outer skirt of the top bracing cover and the bearing, the seal comprising a fixing portion secured by mechanical link to a first cover out of the bottom support cover and the top bracing cover, the fixing portion being axially aligned with the plurality of rolling elements of the at least one bearing; and
 at least one sealing lip extending towards a second cover in such a way that a free end of the lip comes into immediate proximity with a sealing surface of the second cover; wherein the second cover is provided with an annular protection rim protruding from the sealing surface, the protection rim being offset towards the annular passage facing the portion of contact of the free end of the sealing lip with the sealing surface.

2. The device according to claim 1, wherein the free end of the sealing lip comprises a protruding rim directed away from the contact surface.

3. The device according to claim 1, wherein the mechanical link between the seal and the cover consists of a diametral interference between the inner diameter of an inner edge of the fixing portion and the outer diameter of an annular axial outer surface provided on the cover.

4. The device according to claim 1, wherein the seal is securely mounted on the bottom support cover, the sealing lip coming into sliding contact with a bottom sealing surface provided on the top bracing cover.

5. The device according to claim 1, wherein the sealing surface of the second cover is radial, and the protection rim protrudes axially towards a portion of the first cover.

6. The device according to claim 1, wherein the first ring of the at least one bearing is supported by a top face of the annular radial support portion and the second ring is supported by a bottom face of the top bracing cover.

7. The device according to claim 6, wherein the top face of the annular radial support portion comprises an annular axial protuberance provided with an annular concave surface matching the form of and forming support for the first ring of the rolling bearing.

* * * * *